United States Patent Office 3,110,925
Patented Nov. 19, 1963

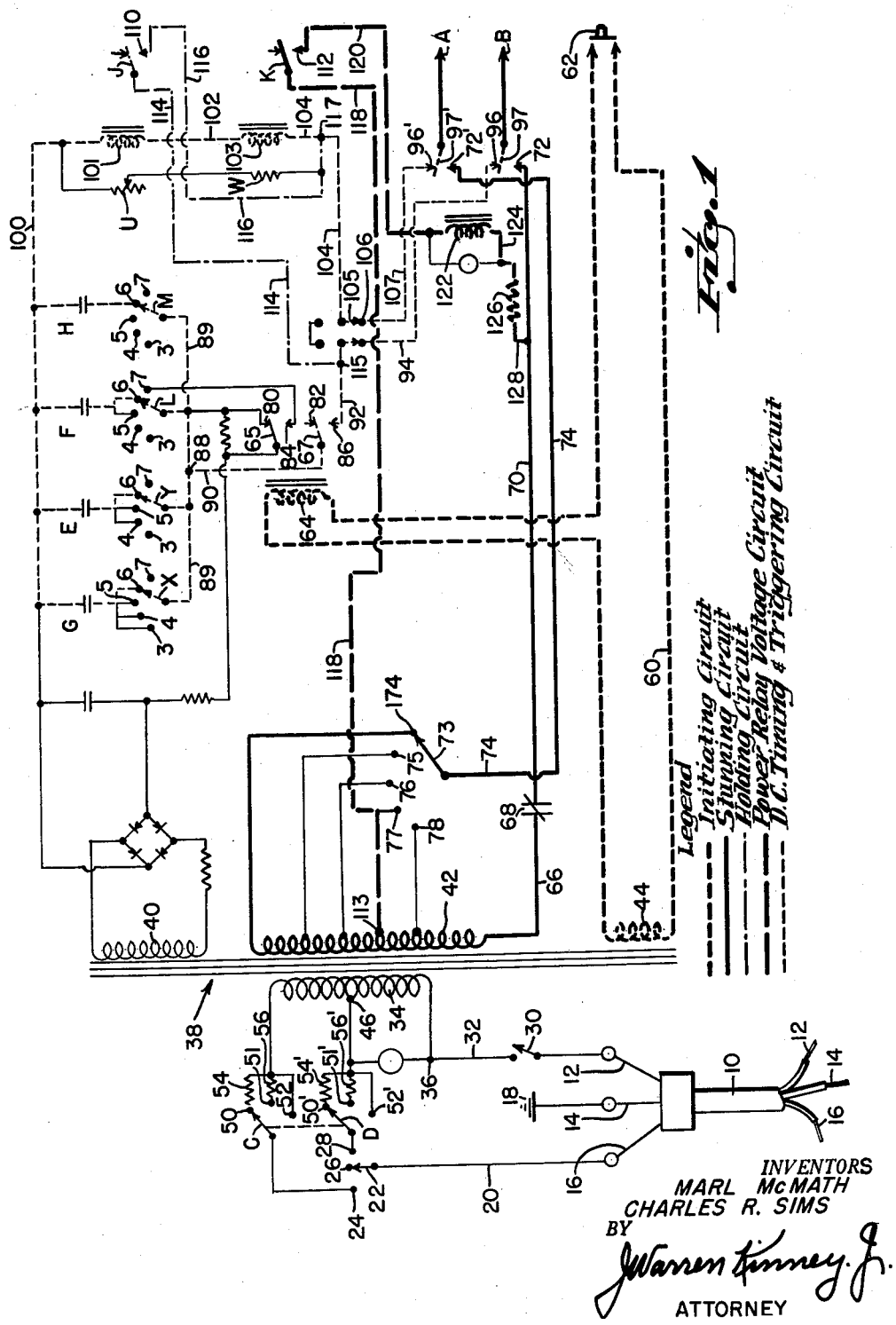

3,110,925
ELECTRIC STUNNER FOR LIVESTOCK
Marl McMath, Fort Thomas, Ky., and Charles R. Sims, Cincinnati, Ohio, assignors to The Cincinnati Butchers' Supply Company, Cincinnati, Ohio, a corporation of Ohio
Filed Sept. 12, 1961, Ser. No. 138,546
7 Claims. (Cl. 17—1)

This invention relates to electric stunners, and more particularly to electric stunners for livestock.

An object of the invention is to provide an electric stunner having means for automatically starting, initiating or triggering a stunning cycle when the electrodes of a stunning wand are applied to an animal.

Heretofore the beneficial effect of electric stunning has been substantially lessened by reason of the fact that the animals have been unduly excited when contacted by a stunner wand, particularly when such a wand was used by an unskilled operator.

One of the primary objects of our invention is to provide an electric stunner which will minimize the excitement imparted to an animal incident to the application of a stunning wand thereto, and which will also eliminate the human judgment factor which has heretofore played such an important part in determining the initiation and duration of a stunning cycle.

A further object of our invention is to provide an electric stunner which includes means for automatically insuring the application of a full stunning cycle, thereby overcoming the serious deficiency in the prior art stunners which permit the application of stunning cycles which are either of too short or too long a duration.

A further object of the invention is to provide an electric stunner which is characterized in that it will automatically provide and apply a constant current effect or treatment to the animal, whereby the electrical conductivity of individual animals is utilized for effectively applying a predetermined stunning dose to each animal regardless of its particular body resistance. This feature is of prime importance since the body resistance of various animals of the same breed varies considerably. In those circuits in which an animal comprises the only resistance in the circuit, the stunning current delivered to the animal will vary inversely with the resistance of the animal with the result that certain animals will receive too much and other animals too little current. In other words, the treatment applied will be variable and therefore undesirable. In sharp contrast thereto, the electric stunner of the subject application has been designed in such a manner that the animal comprises only a part of the total resistance of the circuit, and any changes in the resistance between individual animals will result in a negligible change in the total or overall resistance of the entire circuit, with the result that the duration and intensity of the stunning treatment will be substantially uniform for all animals.

Still a further object of the invention is to provide an electric stunner which includes or incorporates means for automatically applying an initial voltage of a higher potential than desired for actual stunning until such a time as a proper and efficient electrical contact has been made with the skin of the animal, at which time the voltage is automatically reduced to the desired or predetermined stunning voltage for the balance of the stunning cycle. The practical effect of the aforesaid means is to compensate for incrustations on the skin of an animal, which incrustations have the effect of substantially increasing resistance by acting as an insulator, the effect of which is to prevent the application of a desired or proper contact between the skin of the animal and the electrodes of the stunning wand.

Still another object of the invention is to provide an electric stunner with means for enabling an operator to provide automatic or manual timing of the stunning cycle; whether under automatic or manual timing, the preferred circuit also includes a dead-man-control for automatically interrupting the flow of stunning current to the electrodes upon release of a manually actuatable switch under the control of the operator.

These and other objects are attained by the means described herein and as disclosed in the accompanying drawing, in which:

FIG. 1 is a diagram of a stunner circuit embodying the teachings of the present invention.

With reference now to the drawing, the letters A and B denote a pair of stunning electrodes which are secured to, carried by and project from a suitable wand, not illustrated, by which the electrodes may be applied to selected portions of the body of an animal to be stunned.

The numeral 10 denotes generally a conventional power cable containing three wires 12, 14 and 16, one of which, such as 14, may, by way of example, be grounded as at 18 to the metal cabinet, not illustrated, in which the equipment is conventionally housed. Conductor 16 may be connected by conductor 20 to selector arm 22 of a three-position switch, including contacts 24, 26 and 28, wherein contact 26 represents an off position, contact 28 a 110 volt tap, and contact 24 a 220 volt tap.

Conductor 12 may be connected through switch 30 and conductor 32 to one side of primary coil 34 as at 36 of a transformer denoted generally by the numeral 38, which also includes secondary windings 40, 42 and 44. The invention is neither concerned with nor directed to the particular structural details of the transformer, however it will be noted that the primary thereof may be provided with a central tap as at 46 for enabling it to be operated on either 110 or 220 volts.

The letters C and D indicate generally a pair of selector switches which are gang interconnected for concurrent action and for selective engagement with contacts 50, 51 or 52, and 50', 51' or 52', respectively. In the preferred embodiment of the invention, resistors 54 and 54' are disposed in series relationship between their respective contacts 50 and 50' and one side of the primary 34 of the transformer. Other resistors 56 and 56', of a lesser resistance, are also interposed between their respective contacts 51 and 51' and the aforesaid side of the primary. Contacts 52 and 52' are also connected directly to the primary, whereby actuation of switches C and D will selectively place the primary 34 in series circuit with lines 12 and 16 through a maximum, intermediate or no resistance, for thereby controlling the current to the primary.

The heavy dotted lines indicate generally a low voltage initiating circuit, which includes the low voltage secondary coil 44, which is in series circuit with a manually operable push button switch denoted generally by the numeral 62 and a relay coil 64. Closing of switch 62 will apply the voltage of secondary coil 44 to relay coil 64.

The high voltage secondary stunning circuit has been indicated by heavy solid lines, and this circuit includes the secondary coil 42, one side of which is connected by conductor 66 through circuit breaker 68 and conductor 70 to relay contact 72. The other side of secondary coil 42 may be connected through conductor 74 to the other relay contact 72'. It will be noted that a selector switch 73 may be provided for engagement with contacts 174, 75, 76, 77 and 78 of intermediate portions of the secondary coil 42, for enabling an operator to preselect the voltages which will be applied at contacts 72 and 72'.

When relay coil 64 of the initiating circuit has been energized, switch arms 65 and 67 will be shifted downwardly from contacting relationship with contacts 80 and 82 to contacting engagement with contacts 84 and 86, thereby arming the tripping and timing circuit.

It will be noted that when selector arm 67 engages contact 86, terminal 88 of a bank of capacitors G, E, F, and H is connected through conductor 90 to conductor 92, contact 86, conductor 94 to relay contact 95, which latter contact is normally engaged by contact arm 97 which is in series circuit with stunning electrode B.

Conductor 100, which is common to each of capacitors G, E, F and H, is in series circuit with relay coil 101, conductor 102, relay coil 103, conductor 104, switch arm 105, contact 106 and line 107 to relay contact 96', which is normally connected with relay arm 97' of stunning electrode A.

Stunning electrodes A and B are now in an "armed" condition and have a direct current potential appearing across them. When the thus "armed" electrodes A and B are applied to the body of an animal, an electrical circuit will be completed between electrodes A and B through the animal. This flow of current energizes each of relay coils 101 and 103, and the duration of this energization is directly proportional to the amount of charge appearing across condensers G, E, F and H.

Potentiometer U and resistance W are connected across coils 101 and 103, which are connected in series by conductor 102. The resistance of coils 101 and 103 determinate the current leakage time from the condenser bank G, E, F, and H. Potentiometer or rheostat U and resistance W are provided to provide an additional current leakage path. By adjusting the valuable resistance U, the "current leakage time" from the condensor bank may be varied to enable the duration of the time cycle to be accurately set at a predetermined value.

Upon energization of relay coils 101 and 103, switch arms J and K will be moved downwardly into contacting relationship with contacts 110 and 112, respectively, for completing electrical circuits therethrough. Conductor 114 is connected to conductor 92 at 115. Conductor 116 interconnects relay contact 110 with conductor 104 at 117 for thereby completing an electrical circuit between conductors 92 and 104.

Relay switch arm K is simultaneously shifted to complete an electrical circuit through relay contact 112, it being noted that relay switch arm K is connected to transformer tap 113 of the secondary transformer coil 42 by conductor 118. Relay contact 112 is connected by conductor 120 to relay coil 122, conductor 124, resistance 126 and conductor 128 to conductor 70 which, as earlier noted, is connected to one end of secondary coil 42.

When relay coil 122 is thus energized, relay switch arms 97 and 97' are shifted from contacting relationship with relay contacts 96 and 96', respectively, to relay contacts 72 and 72', respectively, for thereby applying the stunning current of conductors 70 and 74 to stunning electrodes A and B.

Concurrently therewith the circuit through conductors 94 and 107 is opened, or interrupted; however, an electrical circuit is maintained between conductors 92 and 104 by reason of relay switch arm J contacting relay contact 110 which maintains the discharge circuit of the capacitors G, E, F and H through relay coils 101 and 103 for the entire duration of discharge of the capacitors. The duration of discharge of the capacitors through resistance W, rheostat U, and relay coils 101 and 103 determines the duration of the stunning cycle.

When the capacitors have discharged to such a value as to effect de-energization of relay coils 101 and 103, contact arms J and K will be automatically shifted away from contacts 110 and 112, respectively, thereby opening the circuit between conductors 114 and 116, and 118 and 120, respectively. At the same time, relay coil 122 is de-energized incident to opening of switch arm K, whereupon switch arms 97 and 97' will be shifted from their respective relay contacts 72 and 72' to engage relay contacts 96 and 96', respectively.

Switch arm 65 will be maintained in engagement with contact 84 so long as relay coil 64 of the initiating circuit is energized. When said coil is de-energized, switch arm 65 will be automatically shifted to engage contact 80 for recharging condensers G, E, F and H of the condenser bank; at the same time, the contact between switch arm 67 and contact 86 will be broken, thereby opening the circuit between conductors 90 and 92.

If it be assumed that an animal to be stunned is covered with matted hair, mud, or other substances which have an insulating effect, the voltage initially applied across electrodes A and B will be of an initially higher value than the desired stunning voltage until a proper electrical contact has been effected between the stunning electrodes and the skin of the animal. This is accomplished by reason of the provision of resistors 54 and 54' in series with the primary coil 34 of the transformer.

When the stunning electrodes A and B are initially applied to an animal and no or little current flows as the result of the poor conductivity of the animal due to incrustations, etc., the high voltage appearing across electrodes A and B will effectively break down or burn through the high resistance incrustation until an effective contact is made. Immediately upon the making of an effective contact between the electrodes and skin of the animal, high current will flow in the circuit causing a substantial voltage drop across resistance 54' with a resultant voltage drop across electrodes A and B. In this manner the current on the stunning electrodes A and B is automatically reduced to the desired value.

The duration of the stunning cycle is automatically determined by the amount of energy stored in the bank of capacitors G, E, F and H, and for ease of control any number of said capacitors from one to all may be utilized by means of a gang switch having arms X, Y, L and M in conjunction with contacts 3, 4, 5, 6 and 7, as illustrated. Each of the aforesaid switch arms is in electrical contact with contact 88 by means of conductor 89.

As positioned in the drawings, the contact arms X, Y, L and M are positioned so as to connect all of the capacitors in parallel circuit with respect to conductors 89 and 100; thereby producing an automatic stunning cycle of maximum duration.

When the switch arms engage contacts 7, the capacitors are removed from the timing circuit whereby the duration of the stunning cycle will be under the manual control of the operator as determined by the time that push button 62 is closed.

It should be fully understood that with automatic timing, viz., with one or more of the capacitors G, E, F and H in the circuit, the duration of the stunning cycle will automatically terminate incident to discharge of the capacitors even though push button 62 is in a circuit-closing position. However, if the push button is released during an automatic timing cycle, the flow of electrical energy to the stunning electrodes will be instantly interrupted.

The present invention is neither directed to nor concerned with the particular means or circuit used to charge the capacitors, it being understood that the charging circuit illustrated, including secondary coil 40, is exemplary rather than restrictive in nature.

What is claimed is:

1. A device for stunning an animal comprising a pair of spaced electrodes adapted to contact the skin of the animal and pass a current of electricity through a portion of the animal's body, a first source of electricity adapted to supply current only for a short period of time, a second source of electricity at a substantially lower potential than said first source, switch means normally connecting said first source to said electrodes, automatic control means for said switch means, said automatic control means being instantly responsive to a flow of current from said first source through said electrodes to operate said switch means so as to disconnect said first source from said electrodes and connect said second source to said electrodes, and said automatic control means permitting said switch means to return to its normal position so as to disconnect said second source from said electrodes after the potential of said first source has dropped a predetermined amount.

2. A device as defined in claim 1, wherein said automatic control means includes an initiating circuit connecting said first source to said switch means, adjustable means in said initiating circuit for controlling the rate of discharge of said first source whereby the length of time said second source is connected to said electrodes may be selectively varied.

3. A device as defined in claim 2, wherein said adjustable means comprises a rheostat.

4. A device as defined in claim 2, wherein said initiating circuit includes a manually controlled switch connected in series between said first source of electricity and said switch means whereby said automatic control means may be manually controlled to disconnect said second source of electricity from said electrodes before the potentials of said first source have dropped said predetermined amount.

5. A device as defined in claim 1, wherein said first source comprises a plurality of condensers.

6. A device as defined in claim 5, including selector switches connected between said condensers and said switch means, said selector switches being operable to selectively connect a predetermined number of said condensers to said switch means.

7. A device as defined in claim 4 wherein said automatic control means includes a holding circuit between said adjustable means and said first source, a relay switch in said holding circuit, said relay switch being closed by a flow of current through said initiating circuit.

References Cited in the file of this patent

UNITED STATES PATENTS

| | | |
|---|---|---|
| 2,827,056 | Degelman | Mar. 18, 1958 |
| 2,977,627 | Morse et al. | Apr. 4, 1961 |
| 3,012,271 | Morse | Dec. 12, 1961 |